United States Patent [19]

Foust

[11] Patent Number: 4,999,664
[45] Date of Patent: Mar. 12, 1991

[54] AUTOMATIC EXPOSURE CONTROL APPARATUS FOR DAYLIGHT/UNDERWATER CAMERA

[75] Inventor: Gregory B. Foust, Spencerport, N.Y.

[73] Assignee: Eastman Kodak Company, Rochester, N.Y.

[21] Appl. No.: 506,050

[22] Filed: Apr. 9, 1990

[51] Int. Cl.$^5$ .......................... G03B 7/08; G03B 17/08
[52] U.S. Cl. ........................................ 354/446; 354/64
[58] Field of Search ............................................ 354/64

[56] References Cited

U.S. PATENT DOCUMENTS 4,634,253  1/1987  Tamamura .......................... 354/64

Primary Examiner—L. T. Hix
Assistant Examiner—David M. Gray
Attorney, Agent, or Firm—Roger A. Fields

[57] ABSTRACT

In a camera for daylight and underwater photography, an exposure control aparatus is adjusted automatically to change an exposure parameter as a function of increased water pressure. Preferably, a pressure sensitive member is mechanically connected to a multi-blade diaphragm to continuously increase the size of a lens opening as the camera is further submerged underwater.

7 Claims, 5 Drawing Sheets

AUTOMATIC EXPOSURE CONTROL APPARATUS FOR DAYLIGHT/UNDERWATER CAMERA

CROSS-REFERENCE TO A RELATED APPLICATION

Reference is made to commonly assigned copending U.S. application Ser. No. 07/334,403, entitled UNDERWATER DISPOSABLE SINGLE-USE CAMERA and filed Apr. 7, 1989, in the name of Alan V. Vandemoere, now U.S. Pat. No. 4,882,600, issued Nov. 21, 1989.

BACKGROUND OF THE INVENTION

1. Field of the Invention

The invention relates generally to the field of photography, and more particularly to an automatic exposure control apparatus for a disposable single-use camera to be used for daylight and underwater photography.

2. Description of the Prior Art

Recently, a disposable single-use 35 mm camera referred to as the "Quick Snap" was introduced by Fuji Photo Film Co. Ltd, and another disposable single-use 35 mm camera referred to as the "Fling 35" was introduced by Eastman Kodak Co. Generally, each disposable camera is a point-and-shoot type and comprises (1) a plastic inner camera shell including a taking lens, a film metering mechanism, and a simple shutter and (2) a paper-cardboard outer sealed pack which contains the inner camera shell and has respective openings for the taking lens and for a shutter release button, a frame counter window, and a film advance thumbwheel on the camera shell. The inner camera shell has front and rear viewfinder windows located at opposite ends of a see-through viewfinder tunnel, and the outer sealed pack has front and rear openings for the respective viewfinder windows. At the manufacturer, the inner camera shell is loaded with a conventional 24-exposure 35 mm film cartridge, and substantially the entire length of the unexposed filmstrip is factory prewound from the cartridge into a supply chamber of the camera shell. After the customer takes a picture, the thumbwheel is manually rotated to rewind the exposed frame into the cartridge. The rewinding movement of the filmstrip the equivalent of one frame rotates a metering sprocket to decrement a frame counter to its next lower numbered setting. When substantially the entire length of the filmstrip is exposed and rewound into the cartridge, the single-use camera is sent to a photofinisher who first removes the inner camera shell from the outer sealed pack and then removes the filmstrip from the camera shell. The filmstrip is processed, and the camera shell and the opened pack may be re-cycled.

While neither of these disposable cameras is adapted for underwater use, their modification for such purpose would be of interest to the consumer. Typically, an underwater camera comprises a standard camera enclosed in some form of waterproof housing, with the manual controls operating through water-tight seals such as "O" rings or continuous flat rubber gaskets. The camera's viewfinder is aligned with glass windows in the waterproof housing, or alternatively a gun-sight viewfinder is mounted atop the waterproof housing. An exposure meter or other light sensitive device, built into the camera or hand-held, is used in the usual manner to adjust the camera's exposure control apparatus in accordance with the available ambient light.

THE CROSS-REFERENCED APPLICATION

The cross-referenced application discloses a disposable single-use camera wherein a plastic inner camera shell is pre-loaded with film and has front and rear viewfinder openings for viewing a subject to be photographed, and a paper outer pack tightly contains the inner shell and has front and rear openings aligned with the respective viewfinder openings. According to the invention, a plastic transparent waterproof casing encloses the outer pack and the inner shell. The transparent casing includes integrally formed front and rear viewfinder lens elements which are optically aligned with the front and rear openings in the outer pack and the front and rear viewfinder openings in the inner shell.

SUMMARY OF THE INVENTION

According to the invention, a camera capable of underwater photography comprises an inner shell and an outer water pressure-resistant casing, and is characterized by including:

pressure sensitive means exposed through an opening in the outer casing for actuation responsive to water pressure;

adjustable exposure control means located within the inner casing; and coupling means for connecting the pressure sensitive means and the exposure control means to adjust the exposure control means in accordance with actuation of the pressure sensitive means responsive to water pressure.

Preferably, the camera includes a taking lens, the exposure control means includes diaphragm means adjustable to vary the size of an aperture optically aligned with the taking lens, and the coupling means includes linkage means connecting the pressure sensitive means and the diaphragm means for adjusting the diaphragm means to increase the size of the aperture in accordance with actuation of the pressure sensitive means responsive to water pressure. Moreover, the exposure control means includes biasing means for adjusting the diaphragm means normally to minimize the size of the aperture for daylight photography.

DETAILED DESCRIPTION OF THE PREFERRED EMBODIMENT

The invention is disclosed in connection with a 35 mm camera. Because such a camera is widely known, this description is directed in particular to photographic elements forming part of or cooperating directly with the invention. It is to be understood, however, that other elements not specifically shown or described may take various forms known to persons of ordinary skill in the art.

Figure 5:
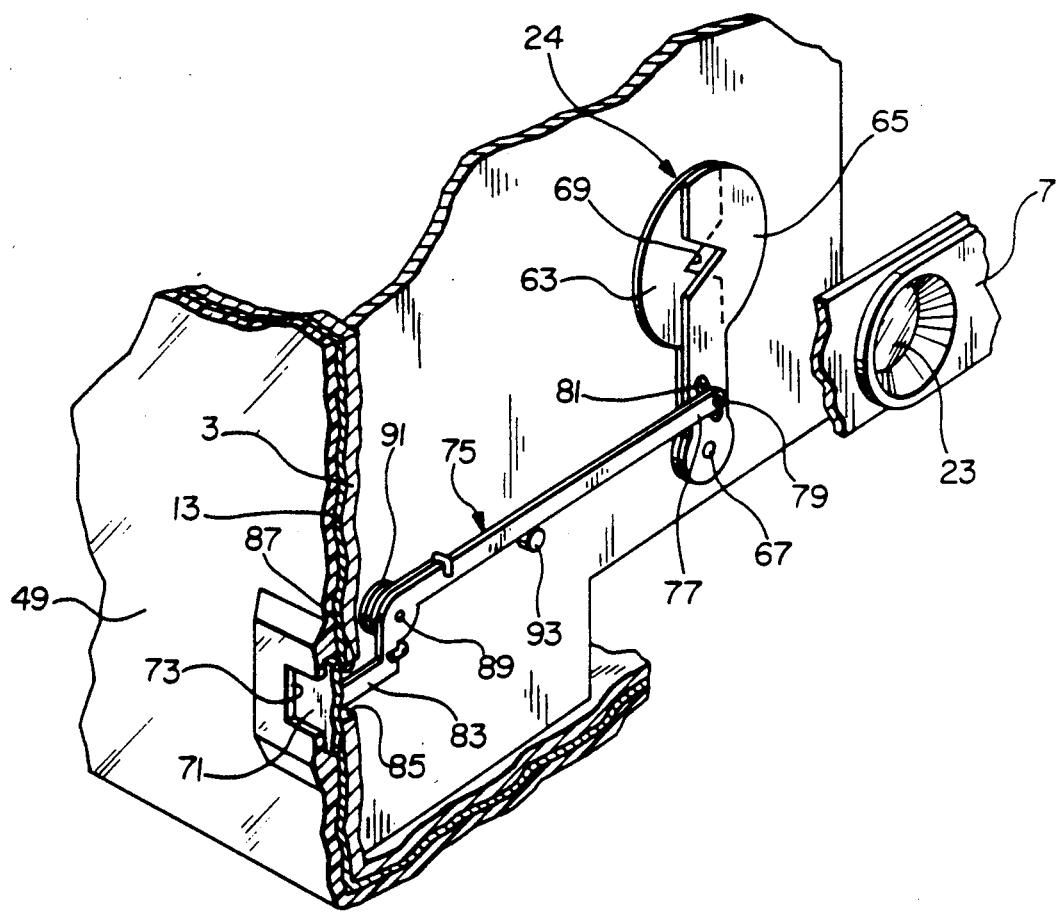
FIG. 5 is front perspective view of an automatic exposure control apparatus for the disposable camera.
Figure 6:
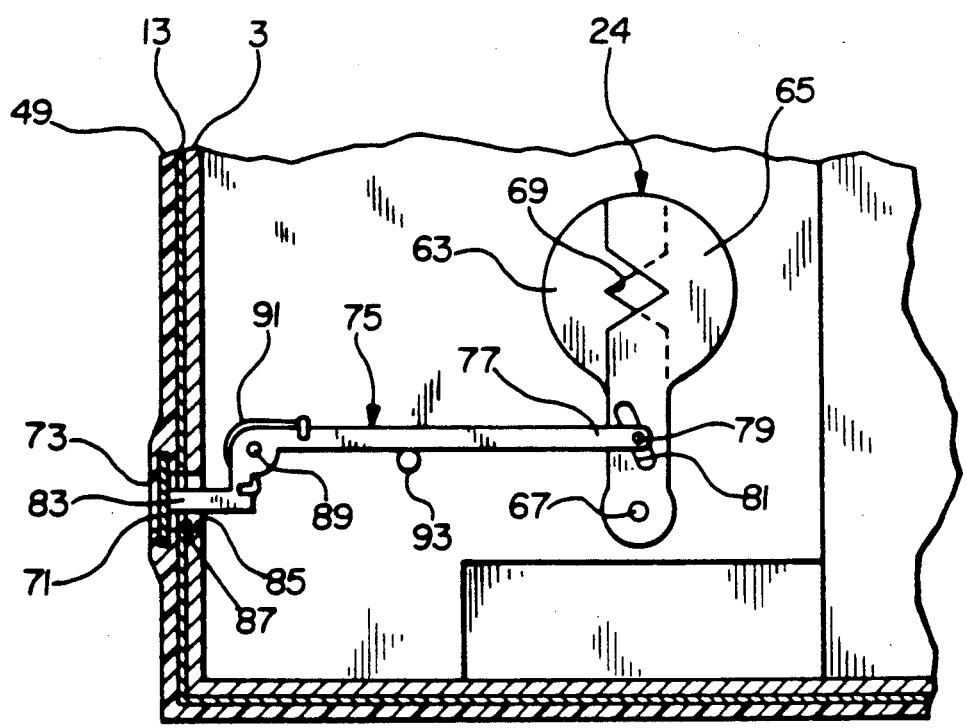
FIG. 6 is a front elevation view similar to FIG. 5.

Referring now to the drawings, FIGS. 1-4 depict a disposable single-use 35 mm camera 1. The disposable camera 1 is a point-and-shoot type and comprises (a) an inner camera shell 3 having a front viewfinder opening 5 arranged in a front wall 7 of the inner shell and a rear viewfinder opening 9 arranged in a rear wall 11 of the inner shell for viewing a subject to be photographed through the two viewfinder openings and (b) an outer sealed pack 13 which tightly contains the inner shell and has a front opening 15 arranged in a front wall 17 of the outer pack and a rear opening 19 arranged in a rear wall 21 of the outer pack to be substantially aligned with the respective viewfinder openings in the inner shell. The inner camera shell 3 houses a taking lens 23, a single-blade shutter (not shown), a film advance and metering mechanism (not shown), a frame counter (not shown), and a multi-blade diaphragm 24 shown in FIGS. 5 and 6. A top wall 25 of the inner camera shell 3 has a top opening 27 for a manually depressible shutter release button 29 and a top window 31 for the frame counter. A top wall 33 of the outer sealed pack 13 has respective top openings 35 and 37 for the release button 29 and the top window 31 for the frame counter. The front wall 17 of the outer sealed pack 13 has a front opening 39 for the taking lens 23. A manually rotatable thumbwheel 41 is coupled to the film advance and metering mechanism via a stem 43 which extends through respective bottom openings 45 and 47 in the outer sealed pack 13 and the inner camera shell 3.

At the manufacturer, the inner camera shell 3 is loaded with a conventional 24-exposure 35 mm film cartridge and substantially the entire length of the unexposed filmstrip is factory prewound from the cartridge onto a take-up spool (not shown) in the camera shell. After the customer takes a picture by depressing the release button 29, the thumbwheel 41 is manually rotated to rewind the exposed frame into the cartridge. The rewinding movement of the filmstrip the equivalent of one frame rotates a metering sprocket (not shown) to decrement the frame counter to its next lower numbered setting. When substantially the entire length of the filmstrip is exposed and rewound into the cartridge, the single-use camera 1 is sent to a photofinisher who first removes the inner camera shell 3 from the outer sealed pack 13 and then removes the filmstrip from the camera shell. The filmstrip is processed, and the camera shell 3 and the opened pack 13 are thrown away.

Figure 3:
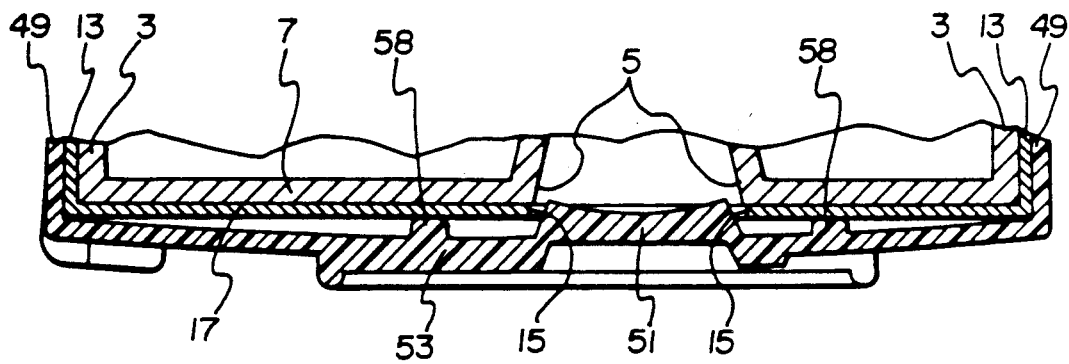
FIG. 3 is a sectional view of the respective front walls of the waterproof casing, the outer sealed pack, and the inner camera shell, particularly with respect to a tunnel-like viewfinder.
Figure 4:
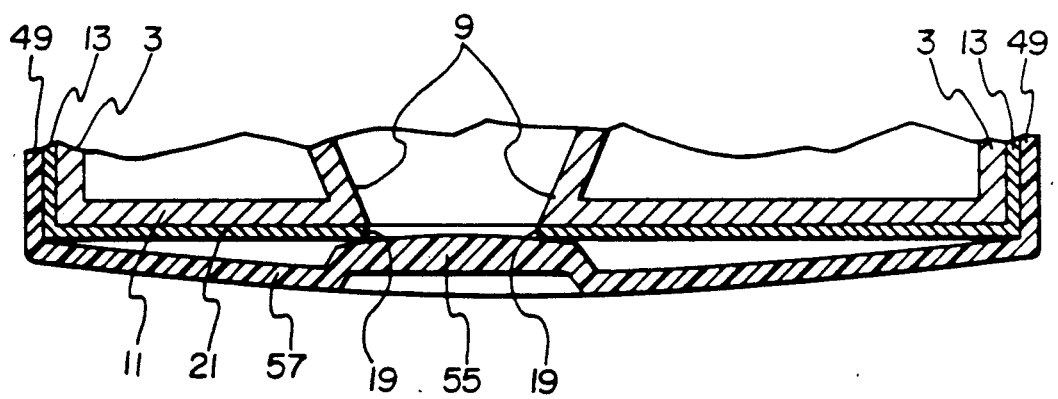
FIG. 4 is a sectional view similar to FIG. 3, but at the respective rear walls of the waterproof casing, the outer sealed pack, and the inner camera shell.

A plastic transparent waterproof casing 49 tightly encloses the outer sealed pack 13 and the inner camera shell 3. See FIG. 1. The waterproof casing 49 includes a front plastic viewfinder lens 51 integrally formed on a front wall 53 of the casing to be optically aligned with the front opening 15 in the outer pack 13 and the front viewfinder opening 5 in the inner shell 3 as shown in FIG. 3, and it includes a rear plastic viewfinder lens 55 integrally formed on a rear wall 57 of the casing to be optically aligned with the rear opening 19 in the outer pack and the rear viewfinder opening 9 in the inner shell as shown in FIG. 4. The front viewfinder lens element 51 extends through the front opening 15 in the outer pack 13 and slightly into the front viewfinder opening 5 in the inner shell 3. See FIG. 3. A pair of spacers 58 are integrally formed on the front wall 53 of the waterproof casing 49 to abut the front wall 17 of the outer pack 13, to limit the extent to which the front viewfinder lens element 51 extends into the front viewfinder opening 5 of the inner shell 3. The rear wall 57 of the waterproof casing 49 is outwardly bowed as shown in FIG. 4 to urge the rear viewfinder lens element 55 firmly against the rear wall 21 of the outer pack 13, to position the rear viewfinder lens element to cover the rear opening 19 in the outer pack.

Figure 1:
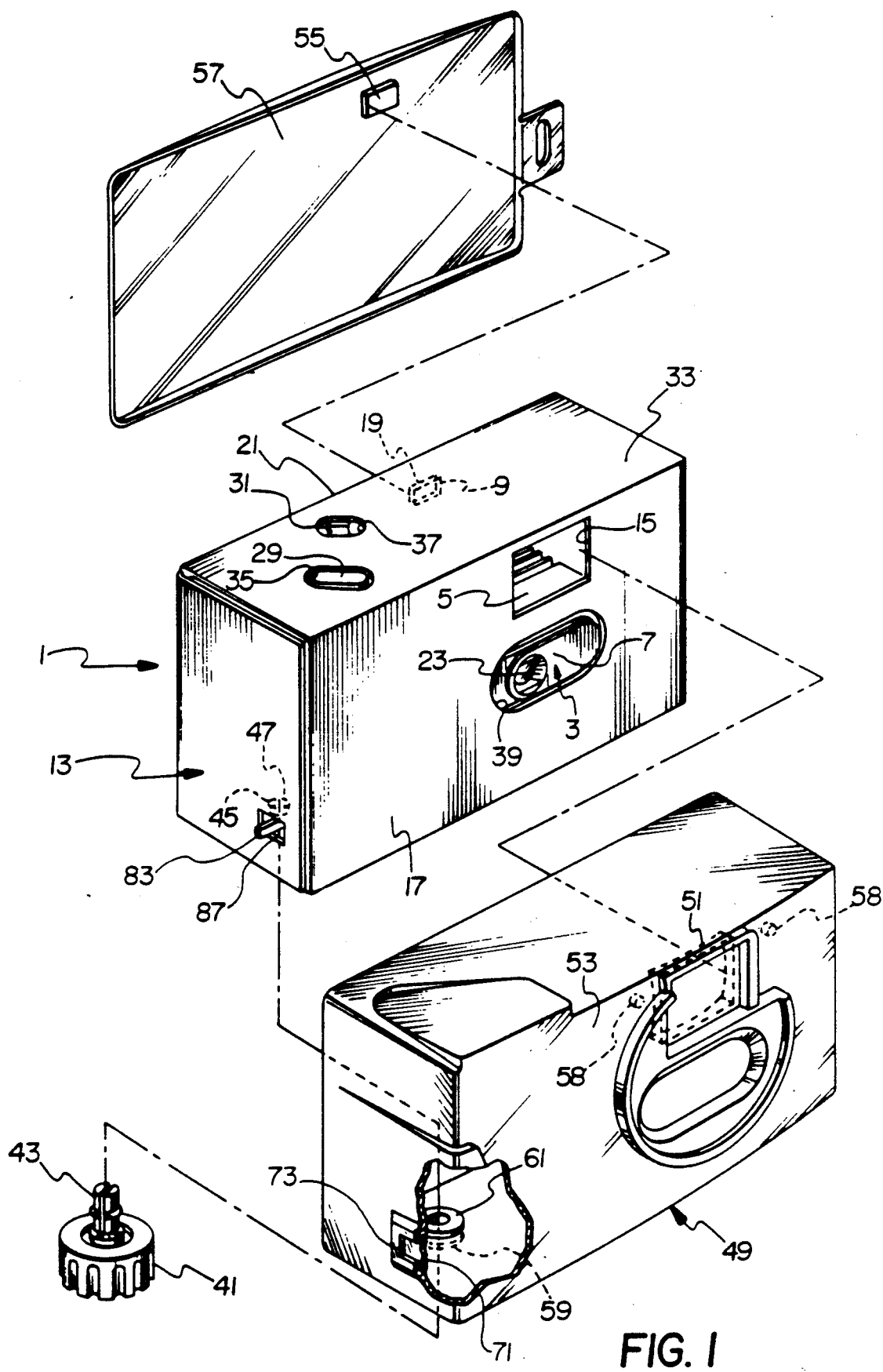
FIG. 1 is a front exploded perspective view of an underwater disposable single-use 35 mm camera according to a preferred embodiment of the invention, showing the disposable camera and a waterproof casing.
Figure 2:
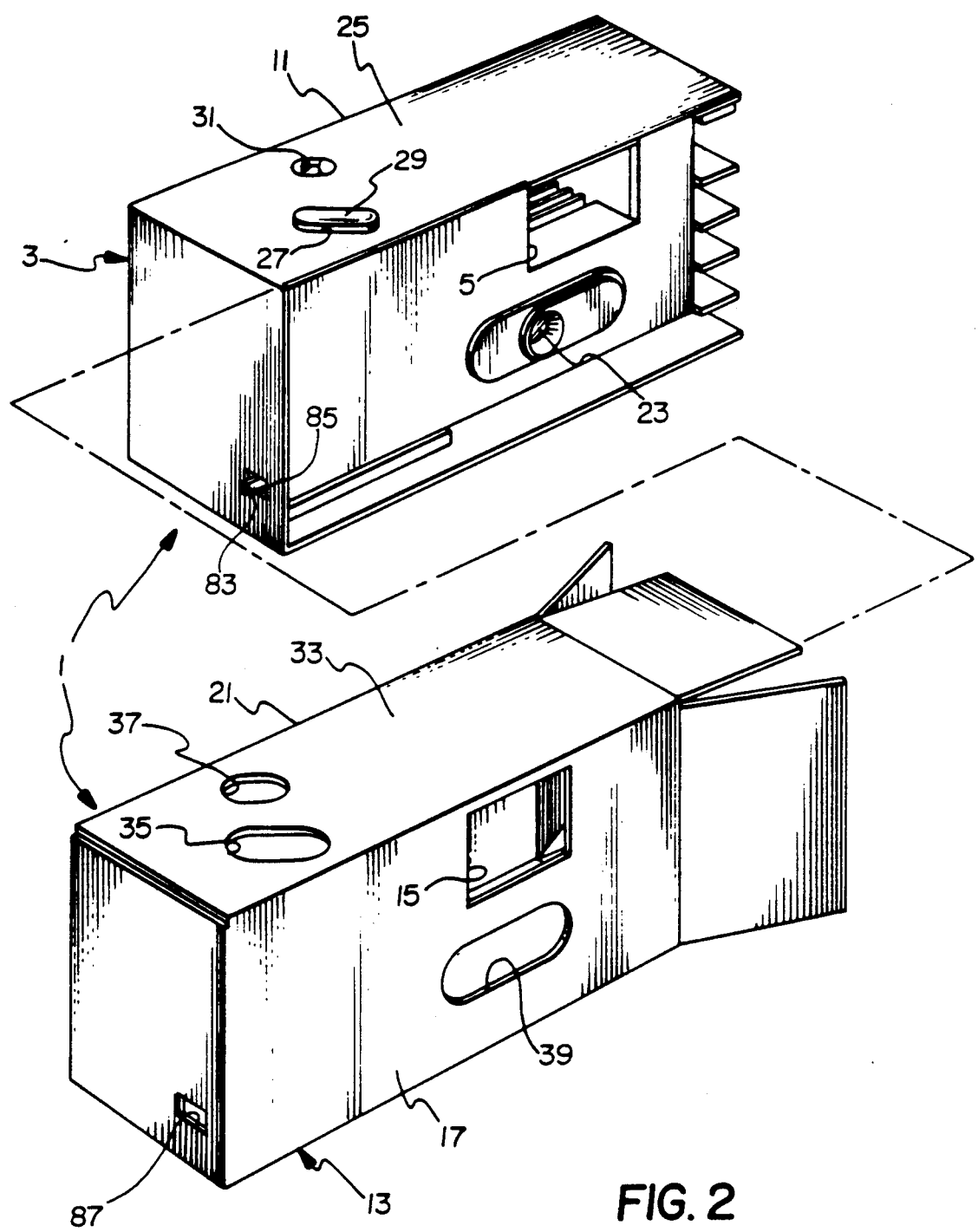
FIG. 2 is a front perspective view only of the disposable camera, showing a plastic inner camera shell and a paper outer sealed pack.

The waterproof casing 49 may be injection molded in two pieces as shown in FIG. 2. The two pieces would then be sealed together in a watertight relation with the disposable camera 1 enclosed between them. Since the front and rear viewfinder lens elements 51 and 55 may be made of the same material as the waterproof casing, it is a simple matter to injection mold the lens elements with the casing. A bottom opening 59 is provided in the waterproof casing 49 to admit the stem 43 of the thumbwheel 41 into the respective bottom openings 45 and 47 in the outer sealed pack 13 and the inner camera shell 3. See FIG. 1. A flat rubber gasket 61 is sandwiched between the bottom opening 59 and the bottom opening 45 to prevent water from entering the casing 49 along the stem 43 of the thumbwheel 41.

The multi-blade diaphragm 24 comprises a pair of diaphragm blades 63 and 65 supported for movement towards and away one another at a pivot pin 67 to continuously increase or decrease the size of an aperture (lens opening) 69. The aperture 69 is optically aligned with the taking lens 23. See FIG. 5. According to custom, the size of the aperture 69 determines an "f-number", which is a relatively high number when the aperture is small and is a relatively low number when the aperture is enlarged. As the size of the aperture 69 is reduced, i.e. the f-number is made higher, the angle of the cone of light rays passing through the aperture from the taking lens 23 becomes narrower. Thus, when the aperture 69 is small, the depth of field covered sharply is increased.

Pressure sensitive means in the form of a resiliently flexible rubber disk 71 is supported within an opening 73 in the waterproof casing 49. See FIGS. 5 and 6. The rubber disk 71 is adapted to be collapsed or bowed increasingly inward of the opening 73 due to increases in water pressure. That is, as the waterproof casing 49 is submerged further underwater, the rubber disk 71 will be bowed further inward of the opening 73.

A linking rod 75 has one end 77 connected to the two diaphragm blades 63 and 65 by means of a cam pin 79 projecting from that end into respective cam follower slots 81 in the blades, and it has an opposite end 83 extending through respective openings 85 and 87 in the inner shell 3 and the outer pack 13 substantially into abutment against the inside face of the rubber disk 71. The rod 75 is supported for movement about a pivot pin 89 and is urged by a very light spring 91 clockwise in FIGS. 5 and 6 against a stop 93. The spring 91 is grounded to the pin 89 or the shell 3.

When the camera 1 is submerged underwater, the rubber disk 71 is bowed inward of the opening 73, causing the rod 75 to be pivoted counter-clockwise in FIGS.

5 and 6 away from the stop 93 to, in turn, pivot the two blades 63 and 65 away from one another to increase the size of the aperture 69 and thereby lower the f-number. When the camera 1 is removed from the water, the rubber disk 73 returns to its original normal position, allowing the light spring 91 to pivot the rod 75 clockwise in FIGS. 5 and 6 against the stop 93 to, in turn, pivot the blades 63 and 65 towards one another to decrease the size of the aperture 69 and thereby raise the f-number. A typical f-number for the aperture 69 when the camera 1 is out of the water is f/22. Conversely, typical f-numbers for the aperture 69 are f/16, when the camera 1 is in one foot of water, and f/8, when the camera is in ten feet of water. Of course, as the camera 1 is submerged underwater from one foot to ten feet, the rubber disk 71 will be progressively bowed inward, gradually increasing the size of the aperture 69 and correspondingly lowering the f-number.

The invention has been described with reference to a preferred embodiment. However, it will be appreciated that variations and modifications can be effected within the ordinary skill in the art without departing from the scope of the invention.

I claim:

1. A camera capable of underwater photography comprising an inner shell and an outer water pressure-resistant casing is characterized by including:
   pressure sensitive means exposed through an opening in said outer casing for actuation responsive to water pressure;
   adjustable exposure control means located within said inner casing; and
   coupling means for connecting said pressure sensitive means and said exposure control means to adjust the exposure control means in accordance with actuation of the pressure sensitive means responsive to water pressure.

2. A camera as recited in claim 1, wherein said camera includes a taking lens, said exposure control means includes diaphragm means adjustable to vary the size of an aperture optically aligned with said taking lens, and said coupling means includes linkage means connecting said pressure sensitive means and said diaphragm means for adjusting the diaphragm means to increase the size of said aperture in accordance with actuation of the pressure sensitive means responsive to water pressure.

3. A camera as recited in claim 2, wherein said exposure control means includes biasing means for adjusting said diaphragm means normally to minimize the size of said aperture for daylight photography.

4. A camera as recited in claim 1, wherein said exposure control means includes f-number control means adjustable to change an f-number value for picture-taking from a relatively low f-number for underwater photography, and said coupling means includes linking means connecting said pressure sensitive means and said f-number control means for adjusting the f-number value to at least one relatively low f-number for underwater photography in accordance with actuation of the pressure sensitive means responsive to water pressure.

5. A camera as recited in claim 4, wherein said exposure control means includes biasing means for adjusting said f-number control means normally to change the f-number value to a relatively high f-number for daylight photography.

6. A camera as recited in claims 1, 2 or 4, wherein said pressure sensitive means includes a resiliently flexible disk-like member adapted to be increasingly actuated responsive to increases in water pressure.

7. A camera as recited in claim 1, wherein said exposure control means includes a plurality of blades supported for movement with respect to one another to continuously vary the size of an aperture formed by said blades, said pressure sensitive means includes a pressure sensitive member adapted to be increasingly actuated responsive to increases in water pressure, and said coupling means includes linkage means connecting said blades and said pressure sensitive member for moving the blades to continuously increase the size of said aperture in accordance with increasing actuation of the pressure sensitive member responsive to increased water pressure.

* * * * *